Jan. 2, 1923. 1,440,971
C. F. COWDREY.
BRAKE TESTING DEVICE FOR VEHICLE WHEELS.
FILED NOV. 29, 1921. 2 SHEETS-SHEET 1

Inventor:
Charles F. Cowdrey
By Robt P. Harris
Attorney

Jan. 2, 1923.                                              1,440,971
C. F. COWDREY.
BRAKE TESTING DEVICE FOR VEHICLE WHEELS.
FILED NOV. 29, 1921.                              2 SHEETS-SHEET 2
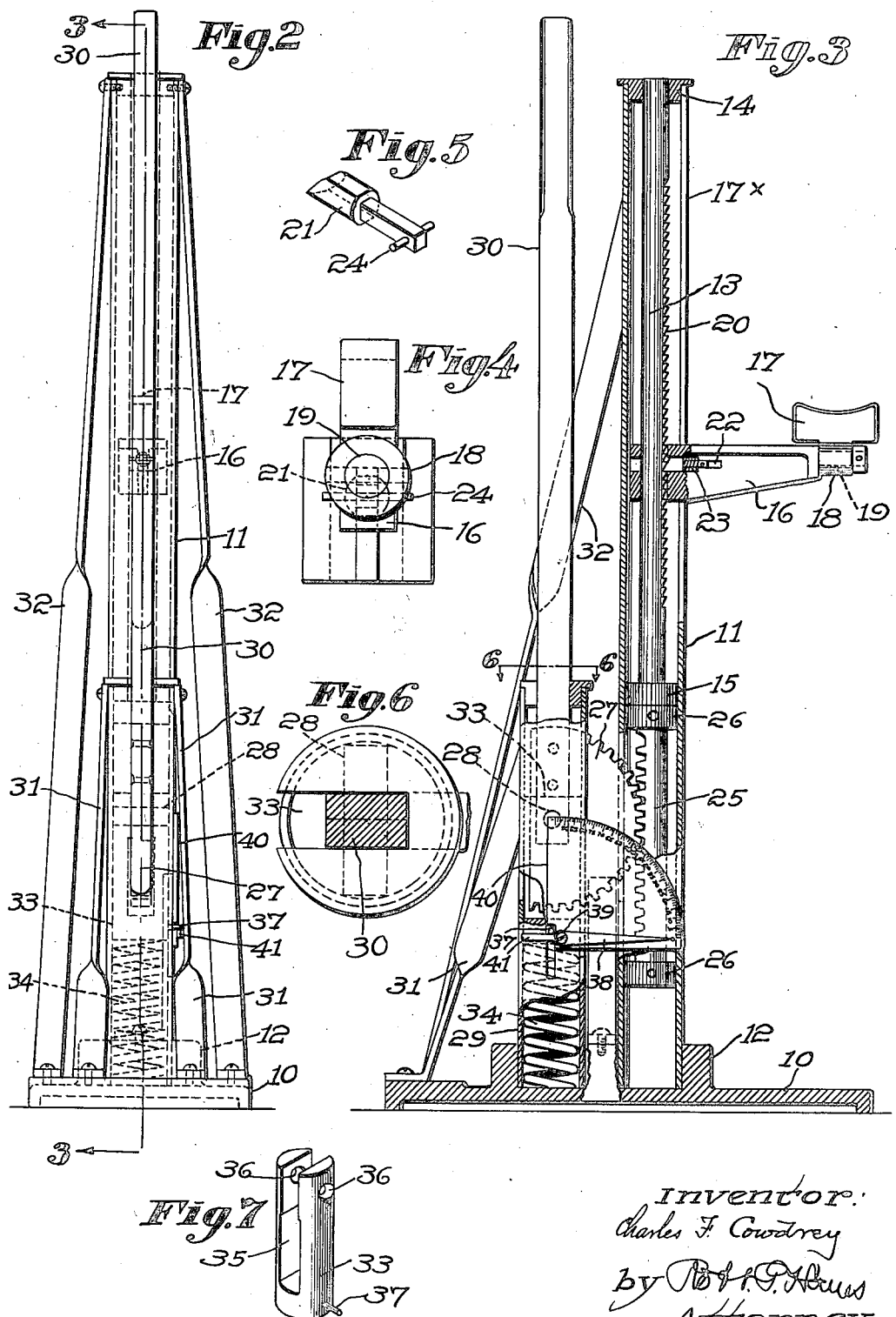

Patented Jan. 2, 1923.

1,440,971

UNITED STATES PATENT OFFICE.

CHARLES F. COWDREY, OF FITCHBURG, MASSACHUSETTS.

BRAKE-TESTING DEVICE FOR VEHICLE WHEELS.

Application filed November 29, 1921. Serial No. 518,676.

*To all whom it may concern:*

Be it known that I, CHARLES F. COWDREY, a citizen of the United States, residing at Fitchburg, in the county of Worcester and State of Massachusetts, have invented an Improvement in Brake-Testing Devices for Vehicle Wheels, of which the following description, in connection with the accompanying drawings, is a specification, like characters on the drawings representing like parts.

This invention relates to means for testing the action of a brake upon the wheels of a vehicle, in order that any inequality in the brake action may be readily equalized and made uniform.

Unless the action of the brake upon the wheels of a vehicle at opposite sides thereof is the same or substantially so, the movement of the vehicle on the application of the brake is liable to cause the vehicle itself to swerve from its direct path of movement, due to the inequality of freedom from rotation of the wheels at opposite sides of the vehicle. Such inequality in the brake action at opposite sides of the vehicle is one of the large factors that enters into many of the accidents which are now prevalent, more especially in automobile travel.

Where, as in the usual automobile construction, the two wheels at the opposite sides of the automobile are connected together by a differential gearing driven from the motor, any equality of the brake motion upon the wheels at opposite sides of the automobile is liable to be the fruitful source of accidents and other troubles. These facts are recognized in the automobile industry, and equalization of brake action on the wheels at opposite sides of the automobile is sought by hand adjustment of the brakes, whether of the band or shoe type. Such hand adjustment without means for comparing the action of the brakes, is guesswork, and in most instances the brakes on the wheels at the opposite sides of the automobile do not act with the same energy.

In testing the action of a brake upon the wheels of a vehicle, the test should be made while the brake is applied with substantial force, because the relative braking effect upon the opposite wheels of a vehicle may vary with the force with which the brake is applied, and while it is desirable that the brake should operate equally on both wheels irrespective of the force with which the brake is applied, the effect of an unequally adjusted brake upon an automobile is more pronounced when the brake is applied hard. Heretofore in adjusting brakes it has been customary to turn the vehicle wheels by hand while the brake is applied, to estimate its braking effect, but obviously this cannot be done when the brake is applied with substantial force.

Having the above matters in mind, one of the features of the present invention consists in adjustable means engageable with a vehicle wheel and operable with sufficient force to turn the wheel while the brake is applied with substantial force.

Another feature of the invention consists in novel means for indicating the force applied to a wheel to turn it under brake resistance.

The above and other features of the invention and novel combination of parts will be hereinafter described in connection with the accompanying drawings which show one good, practical form of the invention.

In the drawings:—

Fig. 2 is a rear elevation of the brake tester;

Fig. 3 is a sectional view taken on line 3—3 of Fig. 2;

Fig. 4 is a front end view of the wheel engaging arm, shown removed from its supporting means;

Fig. 5 is a perspective view of a pawl to be described;

Fig. 6 is an enlarged sectional view taken on the line 6—6 of Fig. 3; and

Fig. 7 is a perspective view of a detail to be described.

Figure 1:
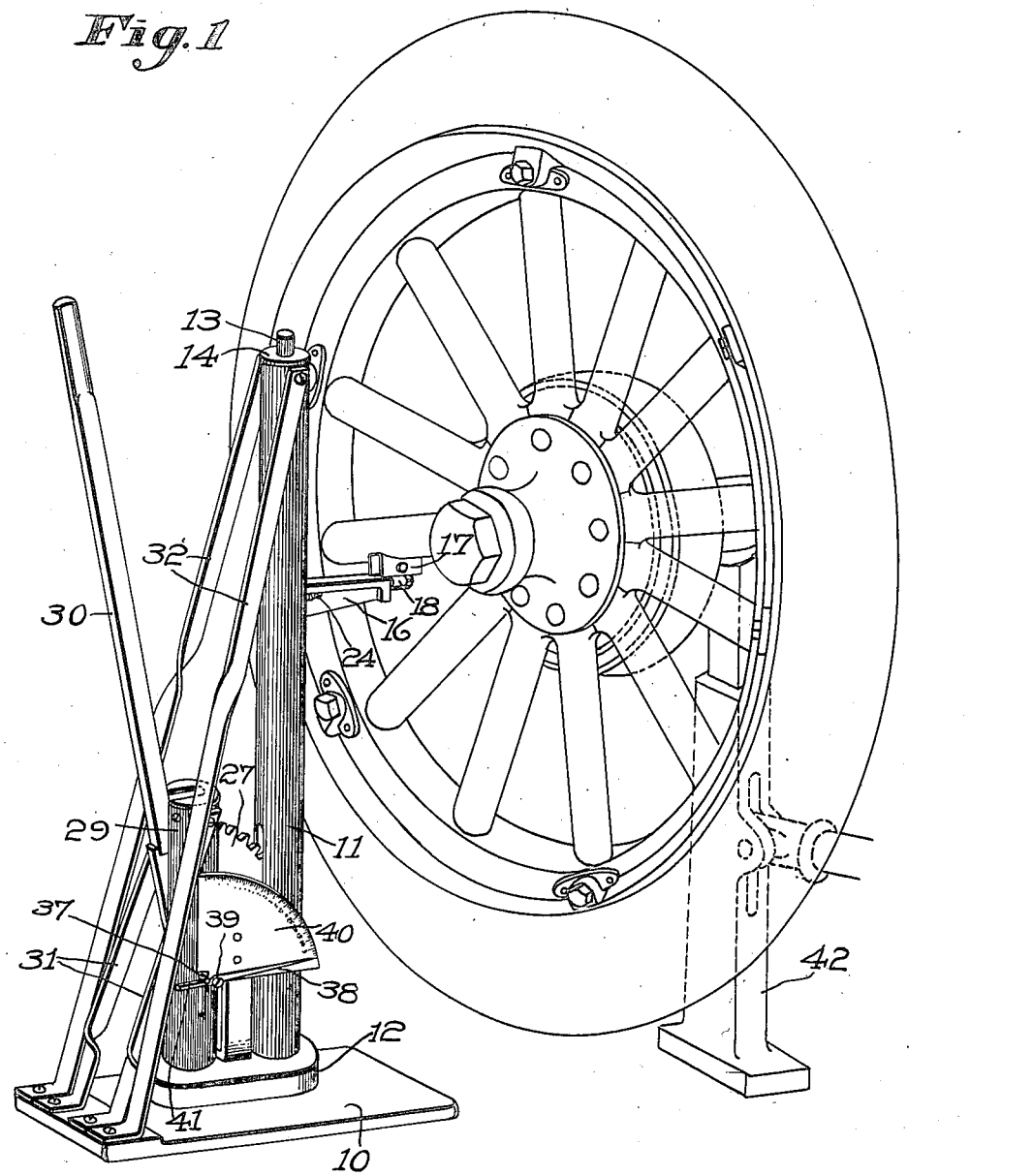
Figure 1 is a perspective view of an automobile wheel showing the present invention associated therewith.

In the embodiment of the invention illustrated, a base 10 is provided having a column 11 extending upwardly therefrom. The column 11 may conveniently be of tubular form, and has its lower end seated in a socket 12 upon the base 10. Within the column 11 is slidably mounted a post 13, the upper end of which may slide through a collar 14 at the upper end of the column, and the lower end may have a head 15 that fits the inner walls of the column. The construction is such that the column serves to support the post 13 in an upright position adjacent a wheel having a brake it is desired to test.

The post 13 has a laterally-extending arm 16 that passes outwardly through an opening 17ˣ in a wall of the column, and the outer end of this arm is provided with a saddle 17 for engaging a wheel to turn the same. The construction of the wheel engaging means may vary with the construction of the wheel to be turned. In the drawings the brake-testing device is shown adjacent an automobile wheel of the type having wooden spokes, but if a wheel of the disc type, or of the type having wire spokes is to be tested, the arm 16 may be provided with a different type of wheel-engaging means. The saddle 17 preferably has a limited rocking movement upon the arm 16 in order that it may conform to a spoke as the angular position of the spoke changes, and to this end, the saddle 17 has a collar portion 18 that fits over a stub shaft 19 of the arm 16.

The arm 16 preferably is adjustably secured to the post 13 so that it may be adjusted to different heights to accommodate different size wheels, and to this end, the arm 16 has a head at its inner end through which the post 13 extends, and the post is provided with rack teeth 20 with which a pawl 21 upon the arm 16 cooperates. The pawl 21 is slidably mounted in a socket 22 of the arm, and is urged toward the rack by a spring 23. The arrangement is such that the arm may be readily slid upwardly along the post 13, and will be locked in the position to which it is raised by the beveled end of the pawl entering a notch of the rack. The arm 16 may be readily lowered by grasping the pin 24 at the outer end of the pawl and holding the pawl out of engagement with the rack.

The post 13 is slidably mounted within the column 11 in order that it may be raised while the arm 16 operatively engages a wheel, to thereby rotate the wheel; and one satisfactory form of means for forcing the post 13 upwardly will now be described.

Within the lower portion of the column 11 is slidably mounted a rack 25 having heads 26 that fit slidably within the column, and the lower end of the post 13 rests upon the upper end of the rack 25. Cooperating with the rack 25 is a segment of a gear 27 pivotally mounted at 28 within a support 29, and the gear 27 is turned by a hand operated lever 30 extending therefrom. The arrangement is such that as the handle is swung downwardly from the position shown in Fig. 3, the gear 27 will cause the rack 25 to move upwardly. The support 29 and the column 11 may be provided with inclined braces 31 and 32 respectively, to increase the rigidity of the supporting structure, and the lever 30 may swing in the space between these braces.

It is important that means be provided for indicating the force required to turn the wheel against the resistance of its brake. Simple and satisfactory means to this end consists in mounting the rack 25 and the gear 29 so that they may move downwardly slightly as the pressure upon the arm 16 increases. In the present instance the support 29 is made hollow and has a block 33 (see Fig. 7) yieldingly supported therein by a coiled spring 34. The gear 27 is carried by the block 33 and the latter is slotted at 35 to clear the gear and has the aligned holes 36 that receive the pivot pin 28 of the gear. The block 33 is also provided with a pin 37 that extends outwardly through a slot in the support 29 and serves to operate a pointer 38 pivotally secured at 39 to a graduated plate 40. The arrangement is such that the pin 37 engages a rearwardly extending portion 41 of the pointer, and as the block 33 moves downwardly it swings the pointer upwardly over the face of the plate 40 to indicate the force required to turn the wheel. The pointer preferably operates with sufficient stiffness to remain in the position to which it is moved by the pin 37, thereby to indicate the maximum force required to rotate the wheel.

In testing the action of a brake upon the wheels of a vehicle in accordance with the present invention, the brake to be tested is applied, and the force required to turn a wheel while the brake is applied is determined by placing the brake tester of the present invention adjacent the wheel as shown in Fig. 1, and then forcing the lever 30 downwardly to raise the arm 16 and thereby rotate the wheel being tested. The force required to turn the wheel will be indicated by the pointer 38, and both rear wheels of the vehicle should be tested while the brake remains in the same position of adjustment, so as to determine the braking action upon each wheel for that position of the brake. The wheel that is being tested is supported clear of the ground by any suitable means such as a jack 42 placed under the axle of the vehicle.

From the foregoing description and the drawings it will be apparent that the arm 16 may be readily adjusted along the post 13 until it engages a spoke of the wheel it is desired to turn, and that since the arm may be engaged with a spoke while the lever 30 remains in its uppermost position, it enables practically the entire downward movement of this lever to be utilized to exert a turning force upon the wheel. It will also be apparent that the present construction is compact, strong and durable, and that the lever 30 will serve to turn a wheel irrespective of how hard the brake may be applied.

What is claimed is:

1. A brake tester for testing the brake resistance to the turning movement of vehicle wheels, comprising in combination, a support, an arm extending laterally from said support and having wheel engaging means, means for bodily lifting said arm to exert a turning force upon a wheel sufficient to turn it while under brake resistance, means yieldable to different degrees under different arm lifting forces, and means operable by the yielding means to indicate the turning force applied to the wheel.

2. A brake tester for testing the brake resistance to the turning movement of vehicle wheels, comprising in combination, a post supported in an upright position, an arm extending laterally from the post and adjustable lengthwise of the post, wheel engaging means carried by said arm, means for exerting a lifting force upon said post sufficient to turn a wheel under brake resistance, compressible means yieldable to different degrees under different pressures, and in an indicator connected to the compressible means for indicating the turning force applied to the wheel.

3. A brake tester for vehicle wheels, comprising in combination, a support, a post guided by the support for vertical movement, an arm carried by the post and having wheel-engaging means, lever operated means for exerting a lifting force upon said post sufficient to turn a wheel under brake resistance, yielding mechanism compressible to different degrees under different pressures, and indicating means operatively connected to the yielding mechanism for indicating the force required to turn the wheel.

4. A brake tester for vehicle wheels, comprising in combination, a support, a post guided by the support for vertical movement, an arm extending laterally from the post and adjustable lengthwise thereof, a spoke engaging means rockingly mounted on said arm, means for exerting a lifting force upon said post sufficient to turn a wheel under brake resistance means yieldable to different degrees under different pressures, and an indicator connected to the yielding means for operation thereby for indicating the force required to effect turning movement of the wheel.

5. A brake tester for vehicle wheels, comprising in combination, a support, an arm extending laterally from the support and guided thereby for vertical movement, wheel engaging means carried by said arm, a lever operable to exert a lifting force upon said arm sufficient to turn a wheel under brake resistance, a fulcrum for said lever supported to yield to different degrees under different pressures, and means actuated by the yielding movement of said fulcrum to indicate the force required to effect turning movement of the wheel.

6. A brake tester for vehicle wheels, comprising in combination, a support, a post guided by the support for vertical movement, an arm upon the post having wheel engaging means, means for exerting a lifting force upon said post sufficient to turn a wheel under brake resistance, spring supported means yieldable under the downward pressure of said post, and means actuated by the yielding movement to indicate the force required to effect turning movement of the wheel.

7. A brake tester for vehicle wheels, comprising in combination, a support, an arm extending laterally from the support and guided thereby for vertical movement, wheel engaging means upon said arm, rack and gear means for exerting a lifting force upon said arm sufficient to turn a wheel under brake resistance, and means actuated by the rack and gear means for indicating the force required to turn said wheel.

8. A brake tester for vehicle wheels, comprising in combination, a support, a post guided by the support for vertical movement, an arm extending laterally from the post and adjustable longitudinally thereof, pawl and rack means for supporting the arm in different positions of adjustment upon the post, means for exerting a lifting force upon the post sufficient to turn a wheel under brake tension, and an indicator connected to the lifting means for indicating the force required to effect turning movement of the wheel.

9. A brake tester for vehicle wheels, comprising in combination, a support, an arm extending laterally from the support and slidable lengthwise of the support, lever operated means for imparting sliding movement to said arm to turn a wheel under brake resistance, and means engaged by the lever means for indicating the turning force applied to the wheel including means yieldable to different degrees under different pressures.

10. A brake tester for vehicle wheels, comprising in combination, a support, a post mounted upon the support for vertical movement, means carried by the post and engageable with a vehicle wheel to rotate it, a lever for supporting and lifting the post, a fulcrum for said lever mounted to yield to different degrees under different pressures, and means actuated by the yielding movement of said fulcrum as the post is lifted by the lever to indicate the force required to effect turning movement of the wheel.

11. A brake tester for testing the brake resistance to the turning movement of vehicle wheels, comprising, in combination, a support, a post mounted upon the support for vertical movement, means carried by the post and engagable with a vehicle wheel to rotate it, a block mounted to yield to different degrees under different pressures, means supported by the block for imparting a lifting movement to said post and wheel engaging means, and means actuated by the yielding movement of said block to indicate the force required to effect turning movement of the wheel.

In testimony whereof, I have signed my name to this specification.

CHARLES F. COWDREY.